United States Patent [19]
Brosmith et al.

[11] Patent Number: 5,651,458
[45] Date of Patent: Jul. 29, 1997

[54] COMPACT DISC STORAGE DEVICE

[76] Inventors: Sean B. Brosmith; Scott Jared Oshry, both of 3233-A Donald Douglas Loop South, Santa Monica, Calif. 90405

[21] Appl. No.: 582,878

[22] Filed: Jan. 4, 1996

[51] Int. Cl.[6] .................................................. B65D 85/57
[52] U.S. Cl. ........................ 206/308.1; 206/232; 206/310
[58] Field of Search ................................. 206/310, 308.1, 206/232, 425

[56] References Cited

U.S. PATENT DOCUMENTS

| | | |
|---|---|---|
| D. 333,610 | 3/1993 | Oshry et al. . |
| 4,535,888 | 8/1985 | Nusselder ............................ 206/308.1 |
| 4,702,369 | 10/1987 | Philosophe ............................ 206/310 |
| 4,778,047 | 10/1988 | Lay . |
| 4,850,731 | 7/1989 | Youngs . |
| 5,086,923 | 2/1992 | King et al. ............................ 206/444 |
| 5,101,971 | 4/1992 | Grobecker ............................ 206/232 |
| 5,269,409 | 12/1993 | Brandt et al. ........................ 206/308.1 |
| 5,477,960 | 12/1995 | Chen ...................................... 206/310 |
| 5,515,968 | 5/1996 | Taniyama ............................ 206/310 |
| 5,529,182 | 6/1996 | Anderson et al. .................... 206/310 |
| 5,531,321 | 7/1996 | O'Brien et al. ...................... 206/232 |

*Primary Examiner*—Paul T. Sewell
*Assistant Examiner*—Nhan T. Lam
*Attorney, Agent, or Firm*—Jack C. Munro

[57] ABSTRACT

A compact disc storage device in the form of thin sheet material body which has a front surface and a rear surface. The body is of a polygonal configuration and forms a plurality of corners. Within each corner on the front surface there is mounted a corner block which includes a slot with each slot to connect with a corner of a pamphlet to thereby supportingly retain the pamphlet in conjunction with the body. The rear surface of the body has centrally located therein a plurality of upstanding resilient fingers. The exterior surface of each of the fingers includes a protuberance which is to function as a locking tab in conjunction with the central hole of a compact disc to securely mount the compact disc onto the body. The side edges of the body include opposite finger recesses which facilitate diametrically opposite grasping of the compact disc. With the disc so grasped, manual deflection of the resilient fingers by pressing on the fingers will result in displacing of the protuberances to permit removal of the compact disc from the body.

2 Claims, 4 Drawing Sheets

COMPACT DISC STORAGE DEVICE

BACKGROUND OF THE INVENTION

1. Field of the Invention

The field of this invention relates to a device for individually storing a compact disc while achieving visibility of both the compact disc and accompanying graphics in the form of a pamphlet which accompanies the compact disc while protecting of the operating surface of the compact disc decreasing the risk of fingerprints, scratches and dust accumulation on this operating surface.

2. Description of the Prior Art

The introduction of the compact digital audio disc (CD) has resulted in a true advance in audio program playback technology. The compact disc contains a digitally coded rendering of the program audio signal transferred onto the operating surface of a disc of polycarbonate plastic. This transferring usually is occurred by molding or stamping into the body of the disc. The encoded operating surface is then uniformly coded with aluminum and coated with a sealant such as lacquer. The aluminum coating on the operating surface of the compact disc creates a reflective surface which is read by a laser beam through the opposite side of the disc. The laser reflection is converted to an audio signal which is heard through standard audio playback components.

The compact disc is considered a substantial advance over the prior art of a vinyl record for several reasons. First, the CD is capable of storing considerably more audio program material per unit area than a vinyl record. This permits the use of a much smaller disc for the presentation of recorded music and hence the term "compact" disc. Next, the ability to retain an audio program capable of being digitally decoded results in substantial improvement in signal-to-noise ratio and program fidelity when compared with the vinyl record. Finally, the use of the laser beam as the transducer results in little, if any, degradation of the compact disc playing surface during playback. The playback properties of the compact disc will thus remain essentially unchanged even after extensive use which is not true in conjunction with the vinyl record. However, there are factors which interfere with the reflection of the laser beam from the aluminum surface and adversely affect CD playback performance. Some of these factors are scratches, dust and fingerprints that are located on the operating surface of the compact disc.

Because of the need to protect the operating surface of the compact disc and protect it from scratches, dust and fingerprints, various protective type of compact disc storage devices have been developed. By far the most prevalent storage device is a package known as a jewel box. The jewel box consists of two pieces of molded styrene plastic which are hinged along a common side to permit the opening of the box as one would open a book. Fitted inside the box is a tray with a center hub which engages the central opening of the compact disc. It is to be understood that each compact disc includes a central opening which is to be used to mount the compact disc in conjunction with the playback apparatus. Though the jewel box serves to protect the compact disc, the box itself suffers from certain disadvantages. The box is difficult to open, and it is difficult to remove the compact disc without bending of the compact disc. Also the jewel box is relatively fragile and can be easily broken when dropped, especially breaking of the hinges of the box. Also, the jewel box is expensive to manufacture because of their three-piece construction, that requires manual assembly of the parts. Further, the jewel box is of far greater size than necessary. Finally, the jewel box is far heavier than necessary.

One alternative to the jewel box for use in after market storage of the compact disc is a carrying case. This carrying case includes a pair of rails. A storage device in the form of a sleeve is to be used which includes rail engaging devices permitting the sleeve to be mounted on the rails. The sleeve is to be slidable on the rails to occupy different positions on the rails. Each sleeve includes pockets and within one pocket is to be located an informational pamphlet that is to apply to a specific compact disc with that compact disc to then be retained in position with another pocket of the sleeve or jacket. The disadvantage of such sleeves is that when removing of the compact disc, it is very easy to place a fingerprint on the operating surface of the compact disc. Such sleeves do however protect the compact disc against dust and scratches.

SUMMARY OF THE INVENTION

One of the primary objectives of the present invention is to utilize a compact disc storage device which substantially diminishes the possibility of placing a fingerprint on the operating surface when removing of the compact disc from the storage device and reinstalling the compact disc on the storage device.

Another objective of the present invention is to construct a compact disc storage device which displays in a readily accessible manner both the compact disc and the accompanying graphics for the compact disc.

Another objective of the present invention is to provide a storage device for a compact disc which insures that the compact disc is stored in a completely protected manner and yet permits withdrawal of the compact disc for usage in a simple and quick manner and which also facilitates reinstallation of the compact disc on the storage device.

Another objective of the present invention is to construct a compact disc storage device which is manufactured in one piece and therefore, relatively inexpensive and thereby sold to the ultimate consumer at a relatively inexpensive price, The compact disc storage device of the present invention is constructed of a sheet material, square shaped body which has a front surface and a rear surface. Within each corner area of the front surfaces is incorporated a corner block with includes a slot. This slot is to connect with a corner of an informational pamphlet thereby mounting the informational pamphlet in conjunction with the body. The informational pamphlet can be removed from the body and utilized by the user and then reinstalled in conjunction with the slots when such is desired. The rear surface of the body includes an enlarged indented area within which is to be located the compact disc with the operating surface of the compact disc being mounted against this indented area. The center opening of the compact disc is to be mounted on an annular series of resilient fingers formed on and protruding from the body. These resilient fingers are to be manually deflectable to an inward position. The exterior surface of each finger includes a protuberance with this protuberance functioning to lockingly restrain in position the compact disc when it is mounted in conjunction with the body. The deflection of the fingers displaces these protuberances from the compact disc permitting withdrawal of the compact disc from the rear surface of the body. Each of the resilient fingers includes a camming surface so that when a compact disc is in the process of being installed in conjunction with the body, the resilient fingers will automatically deflect to a displaced position until the compact disc is completely installed in position at which time the resilient fingers will automatically deflect with the protuberances of the fingers abutting against the outer surface of the compact disc thereby retaining in position the compact disc on the body. The body will also include rail engaging notches that are to be used to mount the body in conjunction with a rail system of a storage container and also to permit movement of a body from one storage container to another. An attachment may be substituted for the informational pamphlet which will permit the storage device to store a separate compact disc.

DETAILED DESCRIPTION OF THE PREFERRED EMBODIMENT

Figure 1:
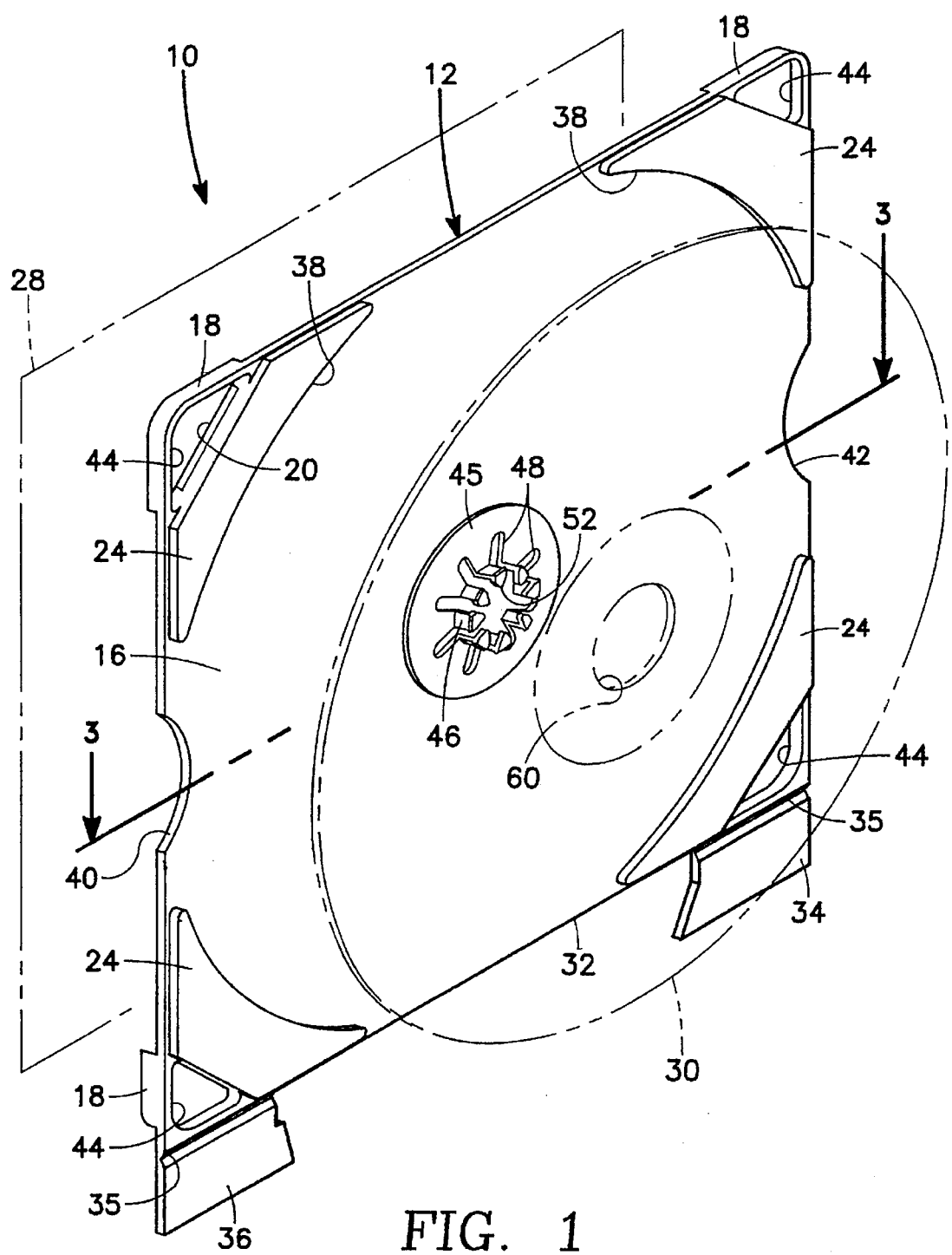
FIG. 1 is a rear isometric view of the compact disc storage device of the present of the invention showing both the compact disc and the informational pamphlet in phantom form and exploded in position away from the storage device.
Figure 2:
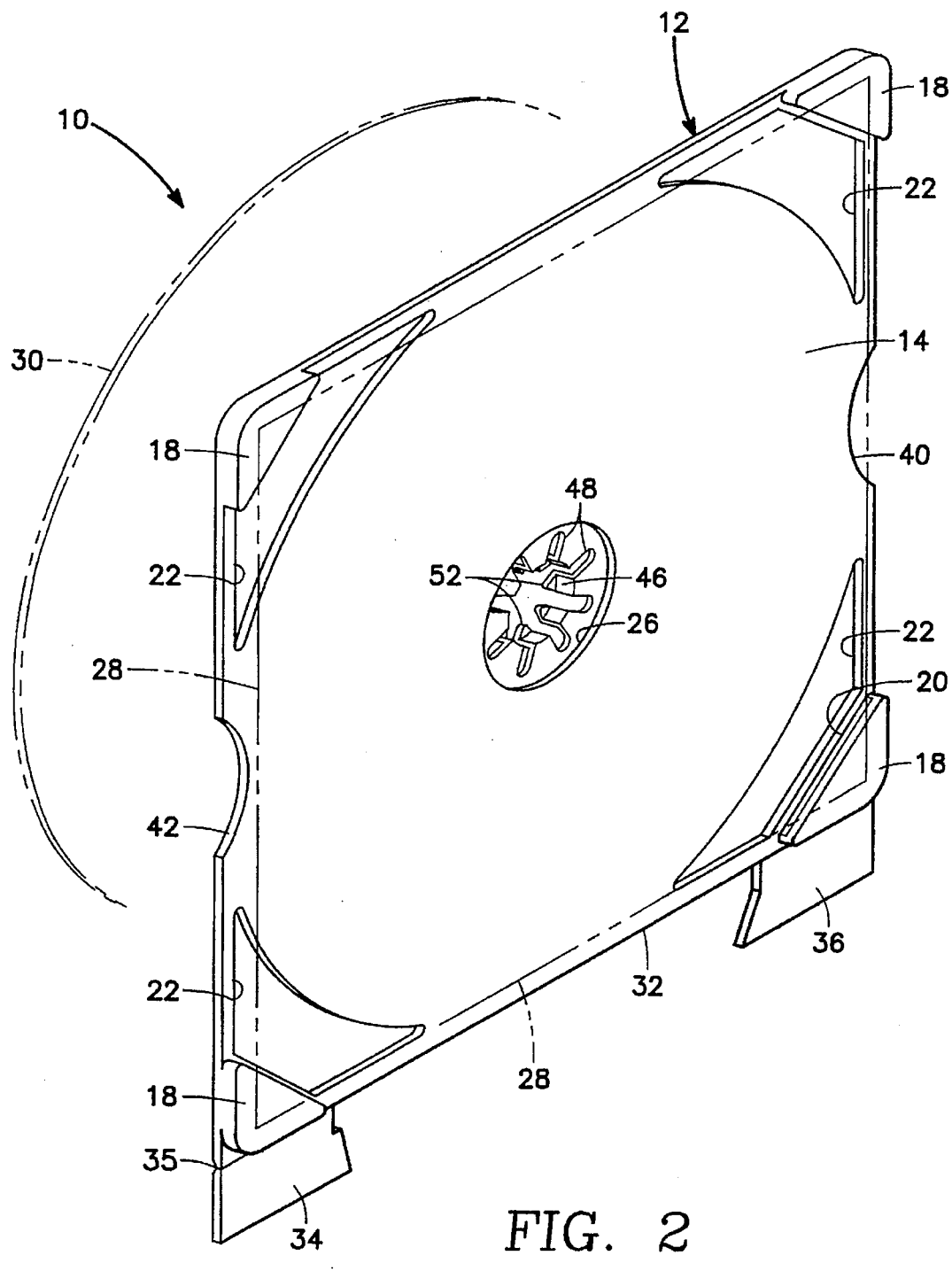
FIG. 2 is a front view of the compact disc storage device of the present of the invention.

Referring particularly to the drawings, there is shown the compact disc storage device 10 of this invention. This storage device 10 includes a sheet material body 12. The body 12 has a front surface 14 and a rear surface 16. The body 12 is formed of a polygonal shape and is actually square in configuration. At each corner of the body 12 on the front surface 14 there is included a corner block 18. Each corner block 18 includes an access slot 20. In the forming of the corner blocks 18 on the rear surface 16 there is formed depressions 44. Adjacent to each corner block 18 and formed within the body 12 is a recess 22. The function of the recess 22 is for the purpose of forming raised areas 24 on the rear surface 16. Centrally formed within the body 12 is a center opening 26. A typical material of construction for the body 12 would be a polyproplene material. The bottom edge 32 of the body 12 includes protrusions 34 and 36. The protrusions 34 and 36 facilitate mounting onto a rail assembly (not shown) of a storage box (not shown). Once installed on the rail assembly, the living hinges 35 for protrusions 34 and 36 allow the body 12 to be deflected by being flipped forward and backward on the rail assembly by the user when browsing through the plurality of bodies 12 mounted on the rail assembly. The body 12 is also to be slidable on that rail assembly by means of the protrusions 34 and 36.

An informational pamphlet 28, which is normally square in configuration, accompanies each and every compact disc 30. The user is to take the informational pamphlet 28 and insert each corner of the pamphlet 28 in conjunction with an access slot 20. The result will be that the informational pamphlet 28 will be securely held in position against the front surface 14 and retained in that position by the corners of the pamphlet 28 being locked in position within the corner blocks 18.

The compact disc 30 is to be located within indented area 38 which is encompassed by the raised areas 24. Formed within the left side edge of the body 12 is a recess 40 with a similarly shaped recess 42 being formed within the fight side edge of the body 12.

Centrally formed in an integral manner with the body 12 are a plurality of L-shaped resilient fingers 46. Actually the fingers 46 extend from a ring 45 which is integral with the rear surfaces 16. The ring 45 is a few thousandths of an inch off the surface 16. The purpose of ring 45 is to keep the operating tip surface 62 of the compact disc 30 slightly spaced from the rear surface 11 forming a gap 47. Therefore, slight pivoting of the disc 30 on the body 12 will not result in any abrasive action on the operating surface 62 from the rear surface 16 since the disc 30 is mounted in a floating manner on body 12. There are actually eight in number of fingers 46 shown. These fingers 46 are arranged in an annular pattern. Located between each directly adjacent pair of fingers 46 is located a slot 48. The outer end of each of the fingers 46 are basically parallel to the rear surface 16 with that portion of the fingers 46 extending toward the center axis 50 of the annular series of fingers 46. The outer end of each of the fingers 46 is formed into a sharpened point 52. Formed exteriorly of the sidewall of each of the fingers 46 is a protuberance 54. The undersurface of the protuberance 54 forms a ledge 56. The top surface of the protuberance 54, which is opposite the ledge 56, is formed into an inclined cam surface 58.

Figure 3:
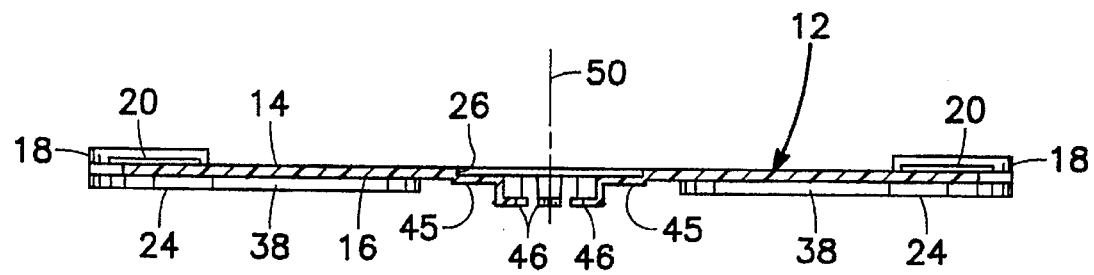
FIG. 3 is a cross-sectional view through the compact disc storage device of the present of the invention taken along line 3—3 of FIG. 2 showing the resilient fingers in an at rest position.
Figure 4:
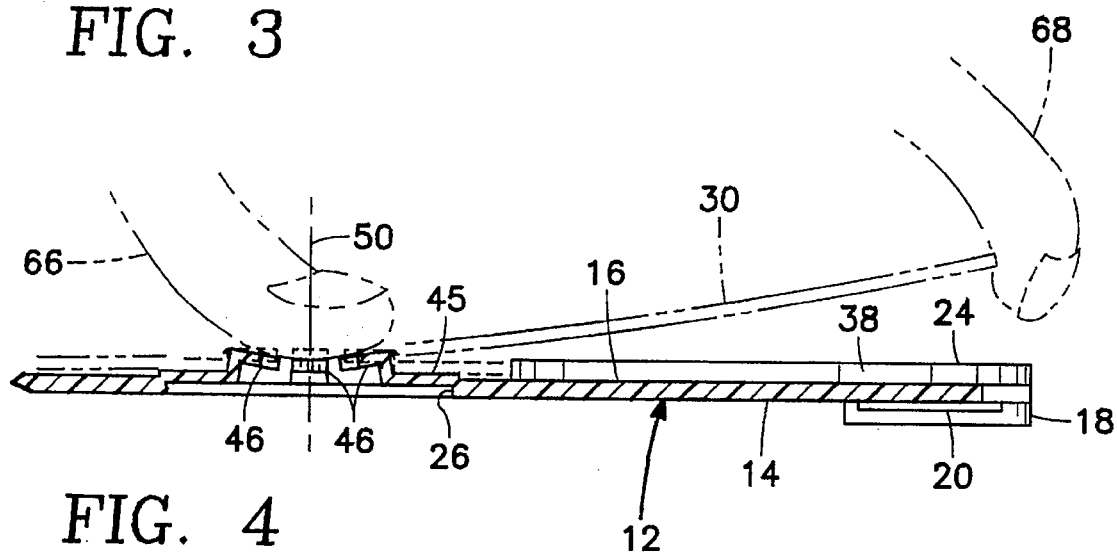
FIG. 4 is a cross-sectional view similar to that of FIG. 3 showing deflecting of the fingers in order to facilitate disengagement of the compact disc from the storage device.
Figure 5:
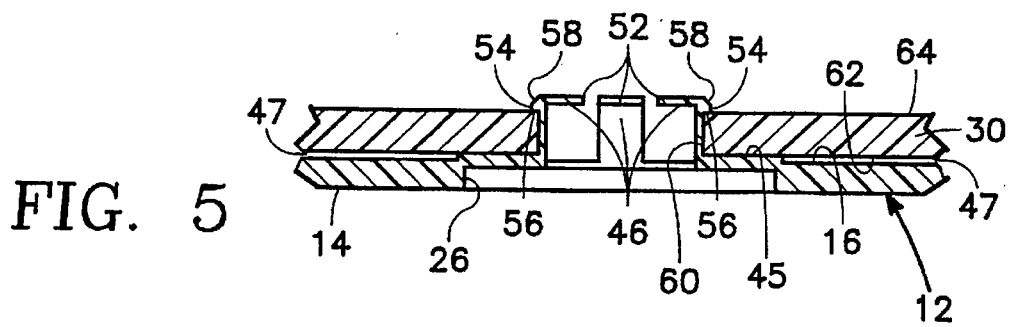
FIG. 5 is an enlarged cross-sectional view similar to that of FIG. 3 showing the compact disc in its installed position in conjunction with the compact disc storage device.
Figure 6:
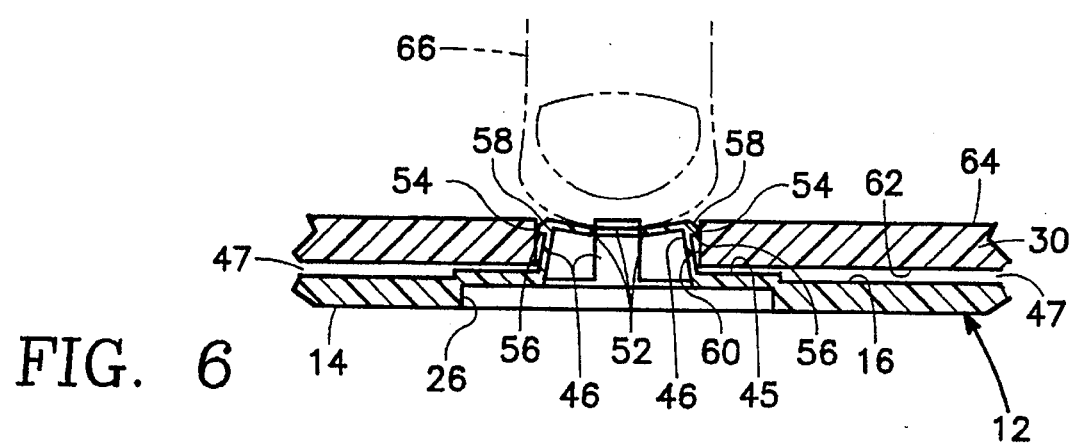
FIG. 6 is an enlarged view similar to that of FIG. 4 depicting removal of the compact disc from the storage device.

The at rest position of the fingers 46 is as shown in FIG. 5 of the drawings. The user is to insert the edge of the center hole 60 against the cam surfaces 58 with the longitudinal center axis of the center hole 60 being in alignment with the axis 50. The user only needs to exert a slight degree of pressure tending to move the compact disc 30 toward the rear surface 16. The result will be that the edge of the hole 60 will slide across the inclined cam surfaces 58 and deflect fingers 46 in a direction towards the longitudinal center axis 50. This deflection is depicted clearly in FIGS. 4 and 6 of the drawings. Once the operating surface 62 of the compact disc 30 comes into contact with the rear surface 16, the fingers 46 will automatically spring back to the at rest position shown in FIGS. 3 and 5 of the drawings. At that particular time the ledge 56 will be located against the outer surface 64 of the compact disc 30 with this position being clearly shown in FIG. 5 of the drawings. The compact disc 30 is now securely retained against the rear surface 16 with the operating surface 62 totally protected from dust, scratches and fingerprints.

When it is desired to remove the compact disc 30 in order to connect such to audio playback equipment (not shown), the user applies manual pressure by means of a finger 66 against the resilient fingers 46. This will result in the fingers 46 deflecting as is clearly shown in FIGS. 4 and 6 of the drawings. With another finger 68 and thumb (not shown), the peripheral edge of the compact disc 34 is to be engaged. This engagement is facilitated by the including of the recesses 40 and 42 so as to provide the adequate space for such engagement. It is to be noted that the pressing of the resilient fingers 46 and the engagement of the periphery of the compact disc 30 can be accomplished in a one handed operation. The user then pulls upwardly on the compact disc 30 as is shown in FIG. 4 in the drawings. This will result in the compact disc 30 being removed from a mounting arrangement in conjunction with the resilient fingers 46. The compact disc 30 can then be played on appropriate audio playback equipment. After playing on this equipment, normally the compact disc 30 will be reinstalled in conjunction with the compact disc storage device 10 of this invention.

Figure 7:
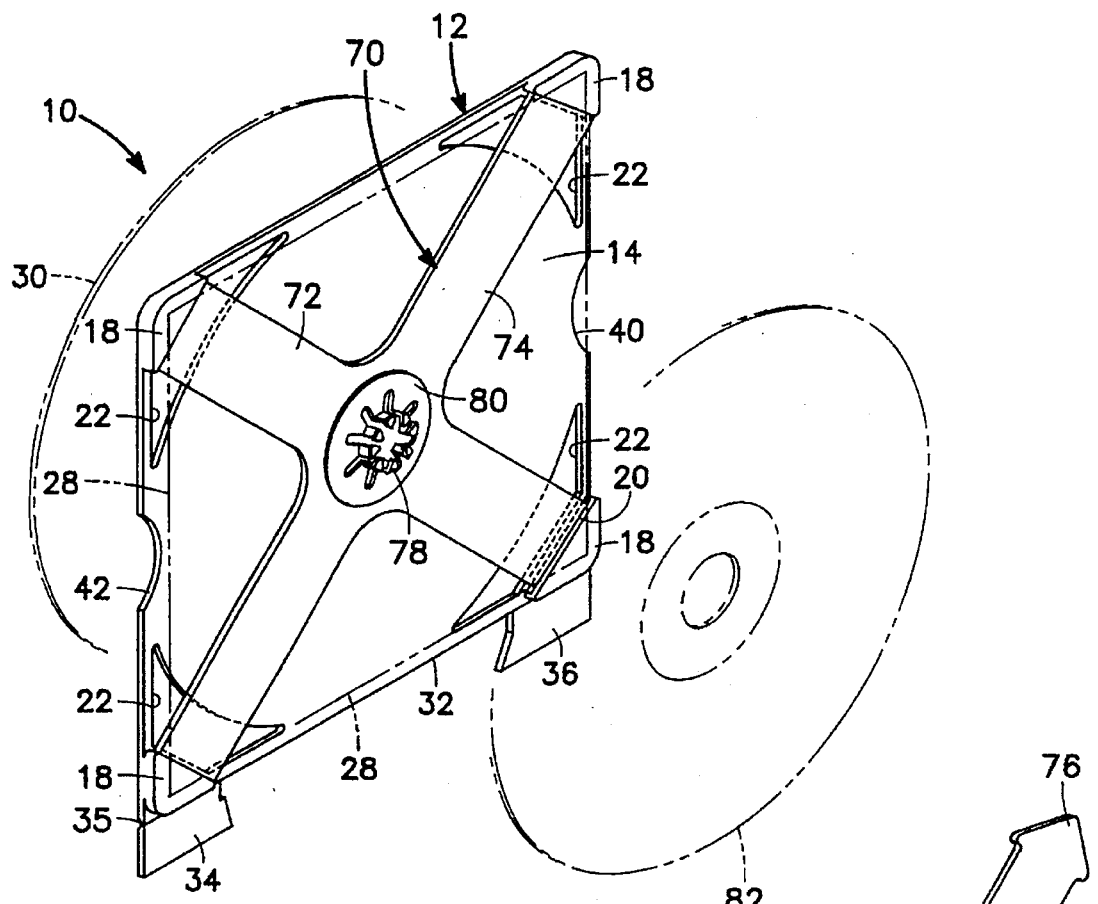
FIG. 7 is a front isometric view of the compact disc storage device of this invention showing the use of an attachment to have the storage device store two compact discs.
Figure 8:
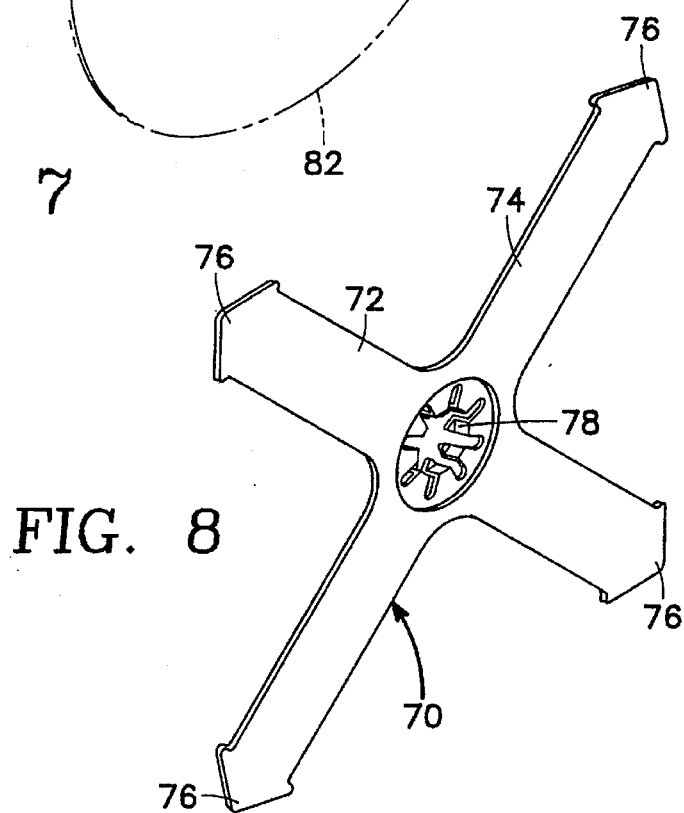
FIG. 8 is a rear isometric view of the attachment of FIG. 7.

At times it may be desirable to use the storage device 10 to store two in number compact discs eliminating the storage of the informational pamphlet 28. In order to achieve this result, an X-shaped, sheet material attachment 70 can be used. Attachment 70 forms a pair of cross members 72 and 74 with the outer end of each cross member 72 and 74 forming a pointed end 76. Each pointed end 76 is to engage with a corner block 18 in the same manner that each corner of the informational pamphlet 28 also engages with the corner blocks 18. The cross members 72 and 74 and pointed end 76 define an attachment engaging means. The attachment 70 is to be installed with the corner blocks 18 by slight bending of the attachment 70 which will then spring back to its at rest configuration once installed. Within the center section of the attachment 70 there is located an annular series of resilient fingers 78 which are in essence identical to the resilient fingers 46 previously described. On the exterior surface of the attachment 70, surrounding the resilient fingers 78, is a slight raised area defined as a ring 80. Ring 80 is in essence similar to previously described ring 45. With the attachment 70 connected to the corner blocks 17, as shown in FIG. 7, a compact disc 82 can be mounted in conjunction with the fingers 78 with the device 10 being used to support both discs 30 and

What is claimed is:

1. A compact disc storage device comprising:

a thin sheet material body having a front surface and a rear surface, said front surface having pamphlet engaging means adapted to connect with and support en information pamphlet, said rear surface having disc engagement means adapted to connect with and support a compact disc, said disc engagement means comprising an annular series of first resilient fingers adapted to snap into a center opening formed within a compact disc to thereby securely mount the compact disc on said storage device, said first resilient fingers being manually deflectable to disengage the compact disc from said storage device; and said body being polygonal shaped forming a plurality of corners, at each said corner there being a corner block, an access slot formed in each said corner block, said pamphlet engaging means comprising said access slot formed within each said corner block, whereby each corner of the informational pamphlet is to be locatable within a said access slot thereby retaining the informational pamphlet in position on said body.

2. The compact disc storage device as defined in claim 1 wherein:

an attachment, said attachment being X-shaped forming a pair of cross members, each said cross member having a pair of outer ends, each said outer end being pointed forming a pointed end, each said pointed end to engage to said access slot of a said corner block thereby mounting said attachment on said sheet material body, said attachment including a series of second resilient fingers for connection with a second compact disc, whereby a single said storage device could be used to store two in number of compact discs.

\* \* \* \* \*